(12) United States Patent
Fang (10) Patent No.: US 11,876,583 B2
(45) Date of Patent: Jan. 16, 2024

(54) VIRTUAL BEAM STEERING USING MIMO RADAR

(71) Applicant: Metawave Corporation, Carlsbad, CA (US)

(72) Inventor: Jun Fang, San Jose, CA (US)

(73) Assignee: Metawave Corporation, Carlsbad, CA (US)

(*) Notice: Subject to any disclaimer, the term of this patent is extended or adjusted under 35 U.S.C. 154(b) by 61 days.

(21) Appl. No.: 17/403,657

(22) Filed: Aug. 16, 2021

(65) Prior Publication Data

US 2021/0384944 A1 Dec. 9, 2021

Related U.S. Application Data

(60) Continuation of application No. 17/011,873, filed on Sep. 3, 2020, now Pat. No. 11,265,046, which is a division of application No. 16/442,436, filed on Jun. 14, 2019, now Pat. No. 10,771,124.

(60) Provisional application No. 62/684,859, filed on Jun. 14, 2018.

(51) Int. Cl.
| H04B 7/08 | (2006.01) |
| H04B 7/0426 | (2017.01) |
| H04B 7/0456 | (2017.01) |

(52) U.S. Cl.
CPC ............ *H04B 7/043* (2013.01); *H04B 7/046* (2013.01); *H04B 7/0478* (2013.01); *H04B 7/086* (2013.01)

(58) Field of Classification Search
CPC ...... H04B 7/043; H04B 7/046; H04B 7/0487; H04B 7/086

USPC .......................................................... 375/262
See application file for complete search history.

(56) References Cited

U.S. PATENT DOCUMENTS

| 7,928,900 B2 | 4/2011 | Fuller et al. |
| 9,711,866 B1 | 7/2017 | Doane et al. |
| 2012/0299773 A1 | 11/2012 | Stirling-Gallacher et al. |
| 2016/0131752 A1 | 5/2016 | Jansen et al. |
| 2016/0233588 A1 | 8/2016 | Bily et al. |
| 2016/0282450 A1 | 9/2016 | Kishigami et al. |
| 2017/0026093 A1* | 1/2017 | Kim ..................... H04B 7/0695 |
| 2018/0088224 A1 | 3/2018 | Kishigami |
| 2019/0115670 A1 | 4/2019 | Kishigami |
| 2019/0317205 A1* | 10/2019 | Meissner ............ H03M 7/3059 |
| 2019/0349042 A1 | 11/2019 | Ramireddy et al. |

OTHER PUBLICATIONS

Tawfique, Sabique, What is difference between normal processor and DSP processor? By, 2016 (Year: 2016).

(Continued)

*Primary Examiner* — Ted M Wang (57) ABSTRACT

Examples disclosed herein relate to a Multiple-Input Multiple-Output (MIMO) radar for virtual beam steering. The MIMO radar has a plurality of transmit antennas and a receive antenna array having a plurality of radiating elements. The MIMO radar also includes a digital signal processor (DSP) configured to synthesize a virtual receive array having N×M receive subarrays from the plurality of transmit antennas and the receive antenna array, where N is the number of transmit antennas and M is the number of receiving elements. Other examples disclosed herein relate to a method of virtual beam steering.

20 Claims, 11 Drawing Sheets

(56) References Cited

OTHER PUBLICATIONS

Efstathopoulos, Georgios, Extended Array Manifolds: Functions of Array Manifolds, IEEE Transactions on Signal Processing, vol. 59, No. 7, Jul. 2011 (Year: 2011).

D.-S. Kim, et al., "A Design of Switch Array Antenna with Performance Improvement for 77 GHz Automotive FMCW Radar," Progress In Electromagnetics Research B, vol. 66, pp. 107-121, 2016.

M. Moeini-Fard, et al., "Transmit Array Antenna Using Nonuniform Dielectric Layer," Advances in Wireless Communications and Networks, vol. 3, No. 3, pp. 23-28, 2017.

M. Rossi, et al., "Spatial Compressive Sensing for MIMO Radar," in IEEE Transactions on Signal Processing, vol. 62, No. 2, pp. 419-430, Jan. 2014.

H. L. Sneha, et al., "Analytical Estimation of Radar Cross Section of Arbitrary Compact Dipole Array," Centre for Electromagnetics CSIR—National Aerospace Laboratories, Bangalore, India, ACES Journal, vol. 29, No. 9, pp. 726-734, Sep. 2014.

L. Baggen, et al., "Satcom-on-the-move: Digital Beam Forming versus Phased Array," The 8th European Conference on Antennas and Propagation (EuCAP 2014), pp. 2610-2614, Apr. 2014.

C. Dahl, et al., "Comparison of virtual arrays for MIMO radar applications based on hexagonal configurations," Proc. of the 12th European Radar Conference (EuRAD), pp. 417-420, Paris, Sep. 2015.

H. Singh, et al., "Radar Cross Section of Phased Array with Parallel Feed Network," Trends in Innovative Computing 2012—Information Retrieval and Data Mining, pp. 13-17, 2012.

H. S. Rawat, et al., "Radar Cross-Section of a Parallel-Fed Cylindrical Array of Dipoles," Electromagnetics, 36:5, pp. 287-304, 2016.

J. Zhang, et al., "Massive hybrid antenna array for millimeter-wave cellular communications," in IEEE Wireless Communications, vol. 22, No. 1, pp. 79-87, Feb. 2015.

P. Pal, et al., "Nested Arrays: A Novel Approach to Array Processing With Enhanced Degrees of Freedom," in IEEE Transactions on Signal Processing, vol. 58, No. 8, pp. 4167-4181, Aug. 2010.

* cited by examiner

FIG. 12

VIRTUAL BEAM STEERING USING MIMO RADAR

CROSS-REFERENCE TO RELATED APPLICATIONS

This application is a continuation of U.S. patent application Ser. No. 17/011,873, filed Sep. 3, 2020, which is a divisional application of U.S. application Ser. No. 16/442,436, filed Jun. 14, 2019, now U.S. Pat. No. 10,771,124 issued on Sep. 8, 2020, which claims priority from U.S. Provisional Application No. 62/684,859, filed on Jun. 14, 2018, and all are incorporated by reference in their entirety.

BACKGROUND

Multiple Input, Multiple Output ("MIMO") radar technology has emerged as a leading contender for advanced communication systems, including those being designed for millimeter wave applications in the 30 GHz to 300 GHz frequency spectrum. A MIMO radar employs multiple transmit antennas and has the ability to jointly process signals received at multiple receive antennas. Each transmit antenna transmits an independent waveform, which enables the MIMO radar to exploit increased degrees of freedom at the transmit array to improve resolution, flexibility, and adaptivity in comparison to conventional phase-array systems. Phase-array systems already possess several advantages over classical radar antennas based on their mechanical steering abilities with a wide Field-of-View ("FoV"). One of their shortcomings, however, is the degraded performance of phased-arrays when beams are steered to large angles. Not only is the antenna gain reduced significantly, but also the beam width is broadened. As a result, the FoV within which beam steering is performed with phase-array systems is usually limited to −120° to 120°.

During the last years new array antenna designs have been proposed and developed, including virtualization of radiating elements in receive mode. There have been several different ways to create virtual arrays and the main such techniques can be in two categories. The first one consists of creating duplicated receiver arrays using specifically placed multiple transmit antennas in MIMO configurations, which is also known as active virtual arrays. The second one, referred to as passive virtual arrays, create virtual receive arrays using a pair or multiple receiving antenna elements according to a specific geometry. In this category, a highly useful technique is to create virtual arrays from physical receive arrays using interpolation.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Virtual beam steering using MIMO radar is disclosed herein. The radar is suitable for many different applications and can be deployed in a variety of different environments and configurations. In various examples, the radar is used in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
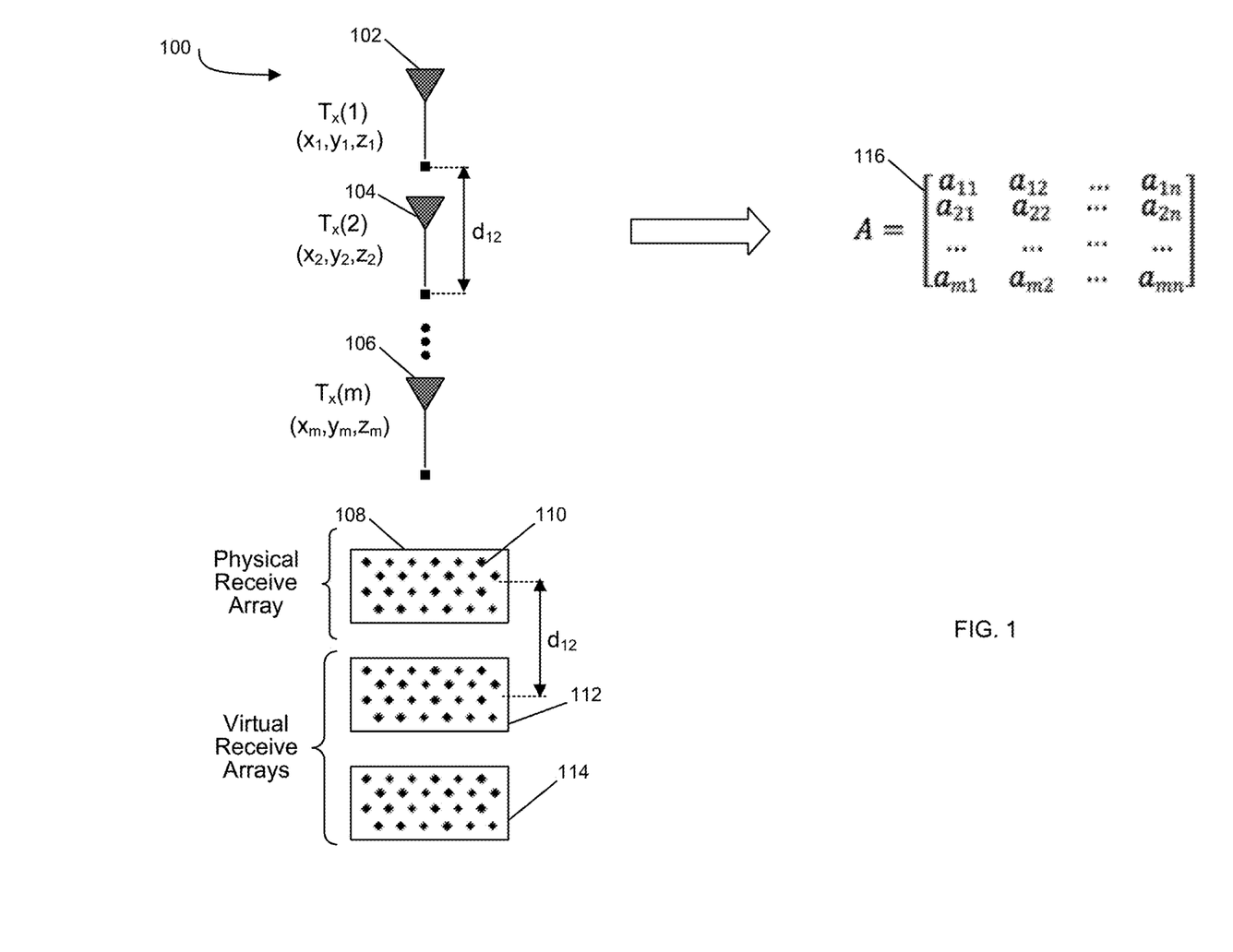
FIG. 1 illustrates a schematic diagram of a virtual antenna array in a MIMO configuration in accordance with various examples of the subject technology.

FIG. 1 is a schematic diagram of a virtual antenna array in a MIMO configuration in accordance with various examples. Not all of the depicted components may be used, however, and one or more implementations may include additional components not shown in the figure. Variations in the arrangement and type of the components may be made without departing from the scope of the claims set forth herein. Additional components, different components, or fewer components may be provided.

Virtual antenna array 100 has multiple transmit antennas 102-106 and a physical receive array 108. Each transmit antenna is positioned at a given set of coordinates (x,y,z), such as $(x_1, y_1, z_1)$ for transmit antenna $T_x(1)$ 102. The transmit antennas are spaced within a relative distance of each other, e.g., distance $d_{12}$ between transmit antennas 102 and 104, and have an omnidirectional transmit pattern, or a specific beam pattern. In this MIMO configuration, the signals from each transmit antenna 102-106 are mutually orthogonal.

The physical receive array 108 is a two-dimensional (2D) array designed with a number of radiating elements. In the example shown, the physical receive array 108 has 24 radiating elements (e.g., radiating element 110). The radiating elements may be antennas of different types, geometries and configurations, depending on the application and desired radiation characteristics, gain, feeding mechanism, polarization, bandwidth, and size. The spacing between each radiating element is smaller than the wavelength such that grating lobes immunity is achieved. The size of the physical receive array 108 is designed so that a satisfactory system level trade-off can be achieved between performance (e.g., signal-to-noise ratio) and processing complexity and speed.

Note that the multiple transmit antennas 102-106 and the physical receive array 108 synthesize a virtual antenna array 100 having N×M receive arrays, where N is the number of transmit antennas and M is the number of receiving elements. In one example, there are 72 virtual receiving elements for the 3 transmit antennas 102-106 and 24 radiating elements in the physical receive array 108, forming virtual receive arrays 112-114. The virtual receive arrays 112-114 are spaced by the same distance $d_{12}$ between transmit antennas 102 and 104. Note also that the virtual antenna array 100 may be represented by complex manifold matrix 116. Manifold matrix A 116 is a function of the geometry of the array, the carrier frequency and the Direction of Arrival ("DoA") of the transmit antennas.

By using sophisticated digital signal processing on virtual antenna array 100, it is possible to steer the receive beam without active devices such as phase shifters and time delay lines, thereby alleviating the hardware complexity by a large amount.

Figure 2:
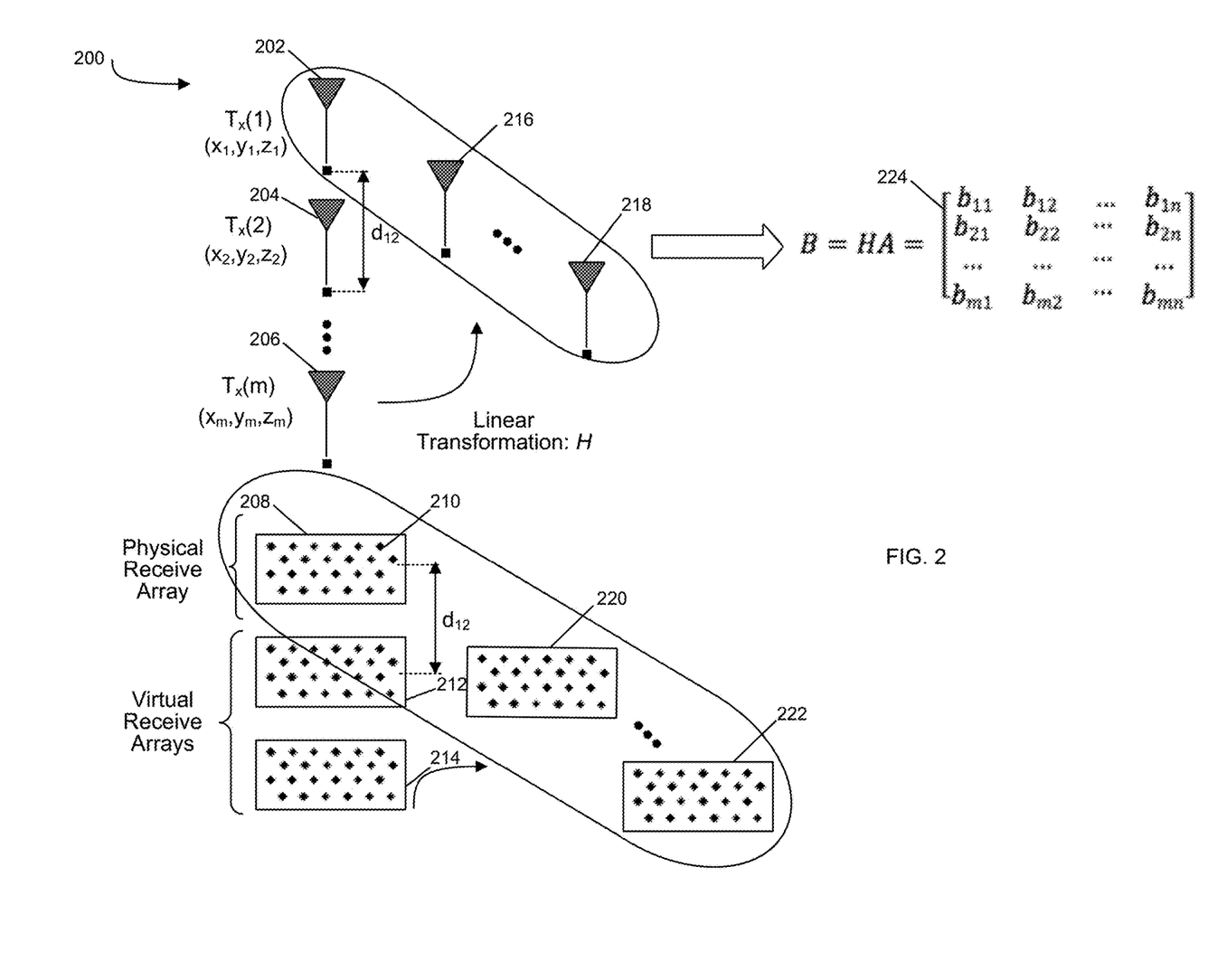
FIG. 2 illustrates a schematic diagram of a virtual antenna array in a MIMO configuration where a linear transformation is performed on the manifold matrix in accordance with various examples of the subject technology.

FIG. 2 illustrates a schematic diagram of a virtual antenna array 200 in a MIMO configuration where a linear transformation is performed on the manifold matrix in accordance with various examples of the subject technology. Virtual antenna array 200 is generated by applying a linear transformation to the manifold matrix A 116 using interpolation. In one example, applying the linear transformation H to transmit antennas 202-206 results in transmit antennas 202, 216 and 218 positioned at an angle relative to transmit antennas' original placement. Similarly, the linear transformation results in receive arrays 208, 220 and 222, also at an angle from their original placement. The resulting receive arrays 208, 220 and 222 are designed so that their regular spacing and shape facilitate the subsequent Digital Signal Processing ("DSP") for DoAs and high level beamforming.

The linear transformation matrix H is calculated under an optimal criterion, such as least squares, maximum likelihood, and so on. When the size of the virtual arrays is smaller than the physical array, the manifold transform can be calculated by least square algorithms. In cases where a virtual array would be larger than its generating physical array, an optimal transform needs to be found by optimization. During this process, precautions can be done to avoid possible grating lobes in receive beam patterns. The proposed system architecture of virtual antenna array 200 is highly flexible in that various active virtual array configurations can be obtained by either changing the transmit antennas spacing and relative locations, and/or the shape and size of the physical receive array 208.

In some implementations, the manifold matrix can be formed from physical geometry of a physical array with the following process. In a MIMO radar system, for a receive array, which is a uniform linear array (ULA) with M antenna elements or sensors, and N transmit antennas, the manifold matrix can be expressed as follows:

$$A = \begin{bmatrix} g_{11}e^{-jw_0\tau_{11}} & \ldots & g_{1N}e^{-jw_0\tau_{1N}} \\ \vdots & \ddots & \vdots \\ g_{M1}e^{-jw_0\tau_{M1}} & \ldots & g_{MN}e^{-jw_0\tau_{MN}} \end{bmatrix} \quad \text{Eq. (1)}$$

where $\{g_{ij}\}$ are the channel responses between the ith transmit antenna to the jth receive antenna element, and $\{\tau_{ij}\}$ are the time delays between the ith transmit antenna to the jth receive antenna element, with respect to the reference antenna element, which can be the one located at the phase center of the virtual receive array, for i=1, 2, ..., M and j=1, 2, ..., N. The time delay $\tau_{ij}$ is a function of the center frequency $\omega_o$, and $d_{ij}$, the distance between the ith element to the reference element, and also the incident angle $\theta_i$, which is the angle between the direction of the incident signal received at the ith element and the normal, which is perpendicular to the plane of the virtual receive array, which can be expressed as follows:

$$\tau_{ij} = \frac{1}{c}d_{ij}\sin(\theta_i) \quad \text{Eq. (2)}$$

for i=1, 2, ..., M and j=1, 2, ..., N, and c=3×10⁸ m/s is the speed of light.

Once the array geometry is determined, all the distances between the antenna elements to the reference element of the jth subarray of the virtual receive array can be determined. For example, the incident angles may be derived from a predetermined or assumed DoA for each of the N subarrays that constitute the virtual receive array.

In some implementations, by selecting geometries for both physical transmit array and physical receive array, different, variable and suitable virtual receive array configurations can be created to meet the beam steering requirements. Depending on the physical array configurations in both transmit and receive arrays, virtual receive array configurations can be created and used for large diversity while alleviating the beam steering loss.

The linear transformation described herein can be used to construct a virtual receive array. Starting from the system requirements, for example the FoV, the beam steering angular range can be determined. The process involves dividing the FoV into a subset number of regions, where each region corresponds to a pre-rotated angle. For a specific angle, a physical receive array can be selected with considerations of the performance and cost, and also in terms of the complexity of the signal processing. For a chosen number, N, of the physical transmit antennas, and a chosen number, M, of the physical receive array elements, the complexity of signal processing can be determined. A working example that presents the process for forming a virtual receive array will be described in more detail in FIGS. 7-10.

Figure 3:
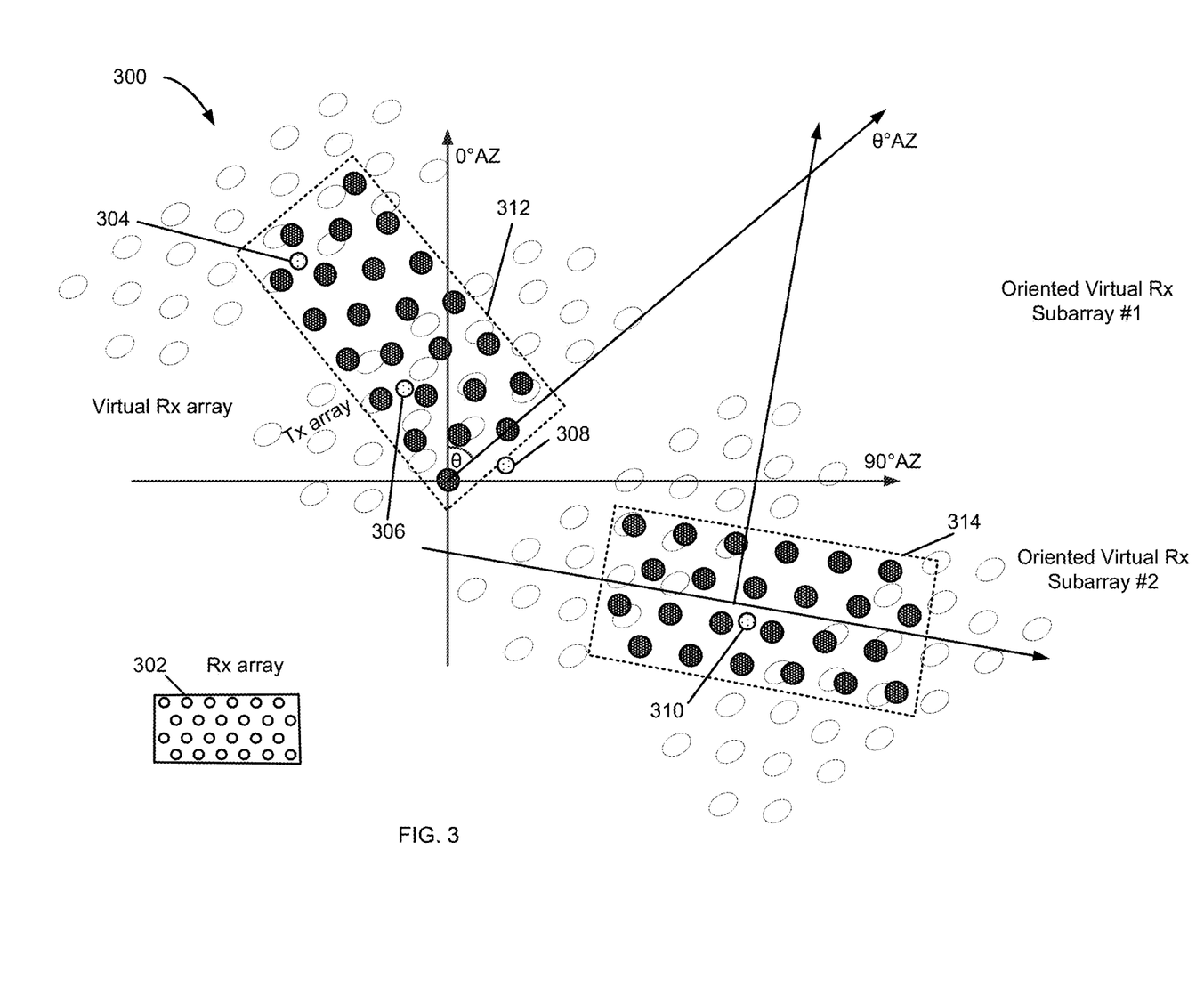
FIG. 3 illustrates a schematic diagram of a virtual antenna array where an oriented subarray is formed by interpolation in accordance with various examples of the subject technology.

Attention is now directed to FIG. 3, which shows a schematic diagram of a virtual antenna array where an oriented subarray is formed by interpolation in accordance with various examples. Virtual antenna array 300 has a physical receive array 302 as shown in the lower left, with 24 radiating elements. Virtual antenna array 300 also has four transmit antennas 304-310. With 4 transmit antennas and a physical receive array with 24 radiating elements, 96 virtual receive elements are created in virtual antenna array 300. In one example, all the signals received by the 96 virtual receive elements are used in interpolation to create the oriented virtual subarray (in blue) 312 at an angle of 0°. In another example, an oriented virtual subarray (in green) 314 is created at another angle. The resulting virtual subarrays enable phased array operations such as beam steering and field scanning to be performed without use, or with reduced use, of phase shifters or time delay lines, with high performance and reduced hardware complexity.

Figure 4:
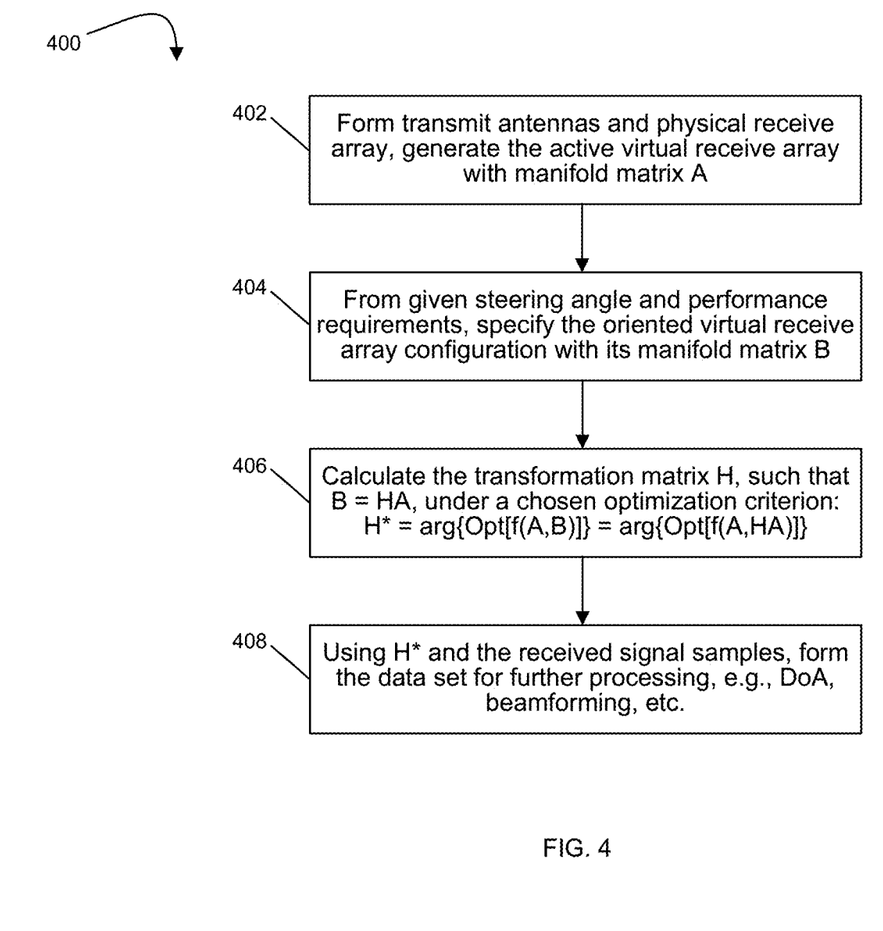
FIG. 4 illustrates a flowchart for creating virtual beam steering using a MIMO radar configuration in accordance with various examples of the subject technology.

FIG. 4 is a flowchart for creating virtual beam steering using a MIMO radar configuration in accordance with various examples. First, from a MIMO radar configuration with a given number of transmit antennas and a physical receive array of radiating elements, an active virtual receive array is formed that is represented by a manifold matrix A (400). Based on a set of steering angle and performance requirements, an oriented virtual receive array configuration is specified with a manifold matrix B (402). From the manifold matrices A and B, a transformation matrix H is determined such that B=HA. The linear transformation matrix is determined under an optimization criterion such that H*=arg{Opt[f(A,B)]}=arg{Opt[f(A,HA)]} (404). Lastly, using H* and the received signal samples, a data set is formed for further processing, e.g., DoA, beamforming, etc.

Figure 5:
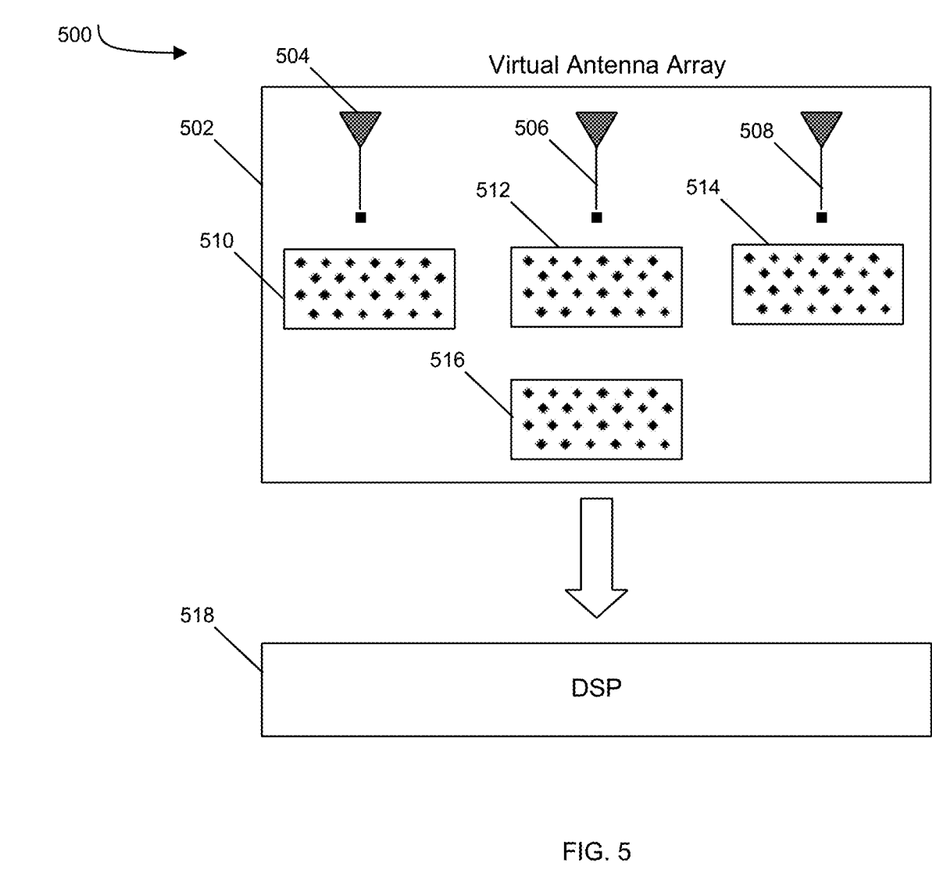
FIG. 5 illustrates a diagram of a MIMO radar system in accordance with various examples of the subject technology.

FIG. 5 shows a diagram of a MIMO radar system in accordance with various examples. MIMO radar system 500 has a virtual antenna array 502 of four transmit antennas 504-510, a physical receive array 512 and virtual receive arrays 514-516. The MIMO radar system 500 also has a DSP unit 518 for performing linear transformations on the virtual antenna array 500 to create virtual beam steering at any desired angle. As described above, this is achieved without the use of phase shifters, time delay elements, and so forth, and at a reduced complexity and performance improvement. All that is required to produce flexible virtual beam steering is a virtual receive array such as array 502 and a DSP unit 518 capable of performing the linear transformations on antenna manifolds as described above. Note that the receive arrays in virtual receive array 500 have multiple radiating elements which can be of any type and configuration.

Figure 6:
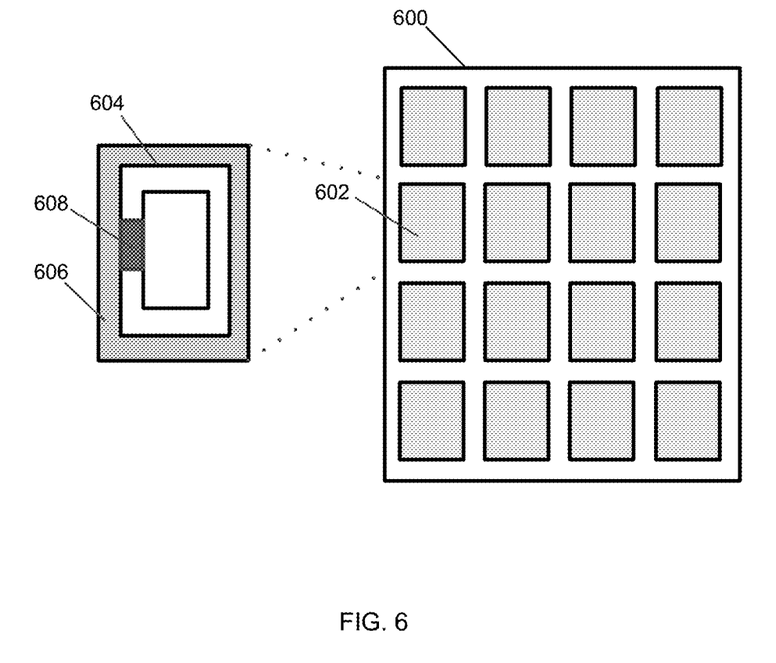
FIG. 6 conceptually illustrates an example receive array for use with the MIMO radar system of FIG. 5 in accordance with various examples of the subject technology.

An example receive array is illustrated in FIG. 6. Receive array 600 contains multiple metamaterial ("MTM") cells positioned in one or more layers of a substrate and coupled to other circuits, modules and layers, as desired and depending on the application. MTM cell 602 is illustrated having a conductive outer portion or loop 604 surrounding a conductive area 606 with a space in between. Each MTM cell 602 may be configured on a dielectric layer, with the conductive areas and loops provided around and between different MTM cells. A voltage controlled variable reactance device 608, e.g., a varactor, provides a controlled reactance between the conductive area 606 and the conductive loop 604. The controlled reactance is controlled by an applied voltage, such as an applied reverse bias voltage in the case of a varactor. The change in reactance changes the behavior of the MTM cell 602, enabling the MTM array 600 to receive focused, high gain beams directed to a specific location. It is appreciated that additional circuits, modules and layers may be integrated with the MTM array 600.

As generally described herein, an MTM cell such as cell 602 is an artificially structured element used to control and manipulate physical phenomena, such as the electromagnetic ("EM") properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna or radar, as small changes to the MTM cell can result in large changes to the beamform.

The MTM cells include a variety of conductive structures and patterns, such that a received transmission signal is radiated therefrom. In various examples, each MTM cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 7:
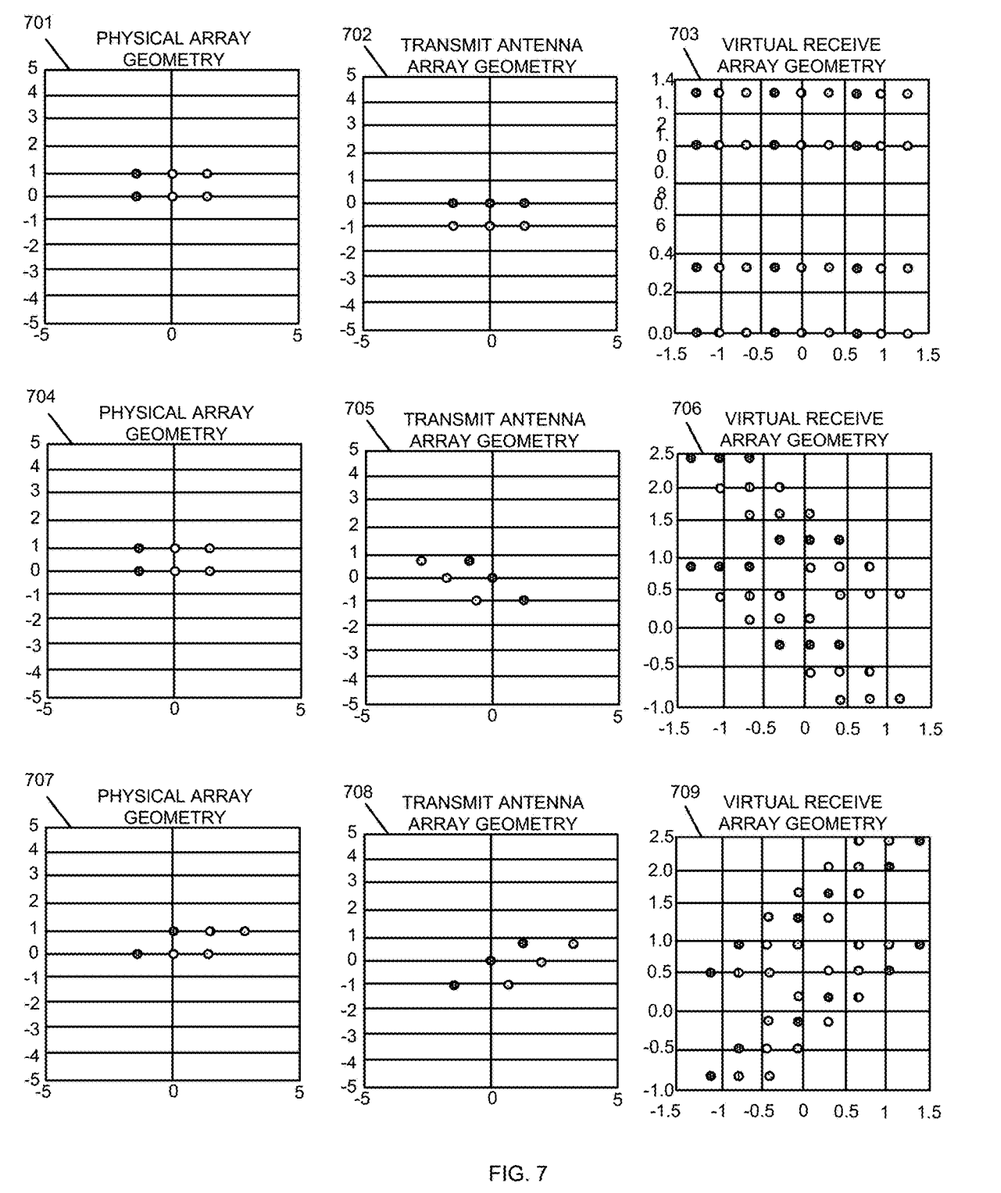
FIG. 7 illustrates plot diagrams of array geometries for different MIMO radar configurations in accordance with various examples of the subject technology.

FIG. 7 illustrates plot diagrams of array geometries for different MIMO radar configurations in accordance with various examples of the subject technology. In FIG. 7, plot diagrams 701-709 depict a physical array (left), a physical transmit array (middle), and a virtual receive array (right) with 3 rotation angles: 0° (top), −45° (middle), and +45° (bottom). As illustrated in FIG. 7, a transmit ($T_x$) array and a receive ($R_x$) array are used. The $T_x$ array can be either sparse or spaced by 2l2, and the $R_x$ array can also be either sparse or spaced by 2l2. In some implementations, the physical transmit array and physical receive array consist of 6 elements to support three rotations of 0°, −45° and +45°.

In some implementations, the azimuth (AZ) orientation angle of 0° can be defined as boresight, where the orientation angle range of [−90°, 90°] can be divided into multiple (e.g., three (3)) "subzones-of-sight": [−90°, −30°], [−30°, 30°], and [30°, 90°]. For an AZ range of [−30°, 30°], the pre-rotation angle can be set to 0°, and the receive beam forming can be within a range of [−30°, 30°]. In some aspects, for a pre-rotated angle in AZ of 45° and −45°, and receive beam forming can be within a range of [−30°, 30°]. The constructed virtual receive array may have a larger aperture for targets in all the three "subzones-of-sight."

The left-most plot diagrams of FIG. 7, from top-to-bottom order, depict three (3) physical receive array configurations, corresponding to 0°, −45° and +45° rotation angles, respectively. For example, the plot diagram 701 depicts a physical receive array with a rotation angle at 0°. The plot diagram 704 depicts the physical receive array with the rotation angle at −45°. The plot diagram 707 depicts the physical receive array with the rotation angle at +45°. In the plot diagram 704, the condition for grating lobe free is that the spacing "dp" is less than λ in the 6 ULAs.

The middle plot diagrams of FIG. 7, from top-to-bottom order, depict three (3) physical transmit array configurations, corresponding to 0°, −45° and +45° rotation angles, respectively. For example, the plot diagram 702 depicts a physical transmit array with the rotation angle at 0°. The plot diagram 705 depicts the physical transmit array with the rotation angle at −45°. The plot diagram 708 depicts the physical transmit array with the rotation angle at +45°. In some aspects, the physical transmit and receive arrays are both reconfigurable as will be described in FIG. 8 and FIG. 9.

The right-most plot diagrams of FIG. 7, from top-to-bottom order, depict three (3) virtual receive array configurations, corresponding to 0°, −45° and +45° rotation angles, respectively. For example, the plot diagram 703 depicts a virtual receive array with the rotation angle at 0°. The plot diagram 706 depicts the virtual receive array with the rotation angle at −45°. The plot diagram 709 depicts the virtual receive array with the rotation angle at +45°.

Figure 8:
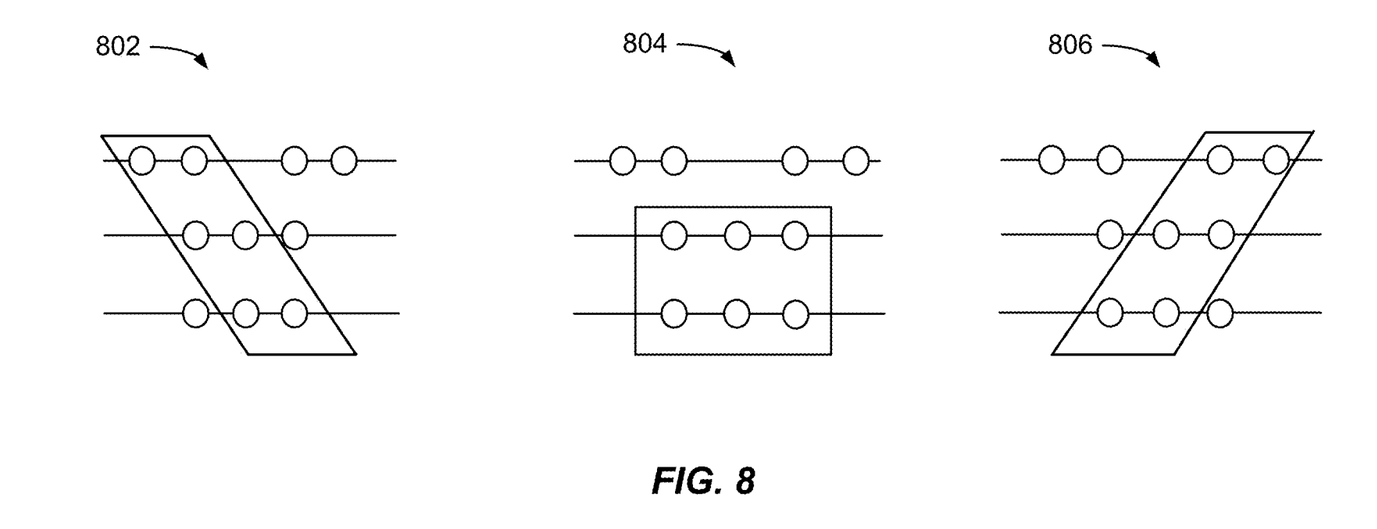
FIG. 8 conceptually illustrates an example of a reconfigurable physical transmit array with different MIMO radar configurations in accordance with various examples of the subject technology.

FIG. 8 conceptually illustrates an example of a reconfigurable physical transmit array with different MIMO radar configurations in accordance with various examples of the subject technology. In FIG. 8, a first configuration pattern 802 depicts the reconfigurable physical transmit array switched to a transmit array with an orientation angle set to −45°, a second configuration pattern 804 depicts the reconfigurable physical transmit array switched to a transmit array with the orientation angle set to 0°, and a third configuration pattern 806 depicts the reconfigurable physical transmit array switched to a transmit array with the orientation angle set to +45°. The first configuration pattern 802 may correspond to the transmit array depicted in the plot diagram 704 of FIG. 7. The second configuration pattern 804 may correspond to the transmit array depicted in the plot diagram 701 of FIG. 7. And the third configuration pattern 806 may correspond to the transmit array depicted in the plot diagram 707 of FIG. 7.

Figure 9:
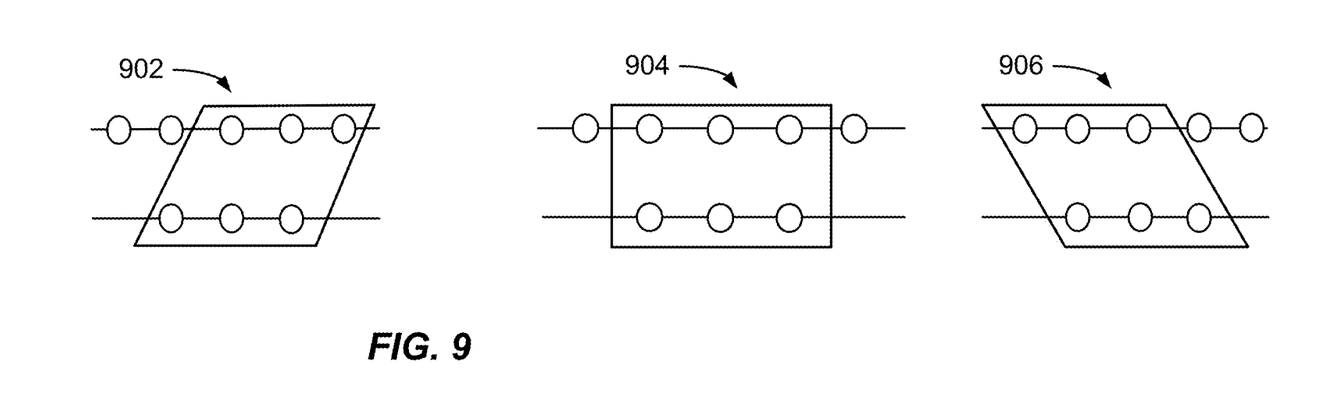
FIG. 9 conceptually illustrates an example of a reconfigurable physical receive array with different MIMO radar configurations in accordance with various examples of the subject technology.

FIG. 9 conceptually illustrates an example of a reconfigurable physical receive array with different MIMO radar configurations in accordance with various examples of the subject technology. In FIG. 9, a first configuration pattern 902 depicts the reconfigurable physical receive array switched to a receive array with an orientation angle set to +45°, a second configuration pattern 904 depicts the reconfigurable physical receive array switched to a receive array with the orientation angle set to 0°, and a third configuration pattern 906 depicts the reconfigurable physical receive array switched to a receive array with the orientation angle set to −45°. The first configuration pattern 902 may correspond to the receive array depicted in the plot diagram 708 of FIG. 7. The second configuration pattern 904 may correspond to the receive array depicted in the plot diagram 702 of FIG. 7. And the third configuration pattern 906 may correspond to the receive array depicted in the plot diagram 705 of FIG. 7.

In both FIG. 8 and FIG. 9, the different MIMO radar configurations can be realized by using switches (not shown). For example, in a transmit array with N signal channels (e.g., N=6), the switches can control N transmit antennas in any of the three rotation scenarios (e.g., 0°, −45° and +45° rotation angles). In a case of rotation by −45° and +45°, 6 Uniform Receive Arrays ("URAs") can be used for beamforming and the performance is enhanced by the diversity gain provided by the enlarged virtual receive apertures in both rotation scenarios. The enhancement can compensate for the possible beam steering loss. In the case without rotation, 4 virtual URAs can be used for receive beamforming.

Figure 10:
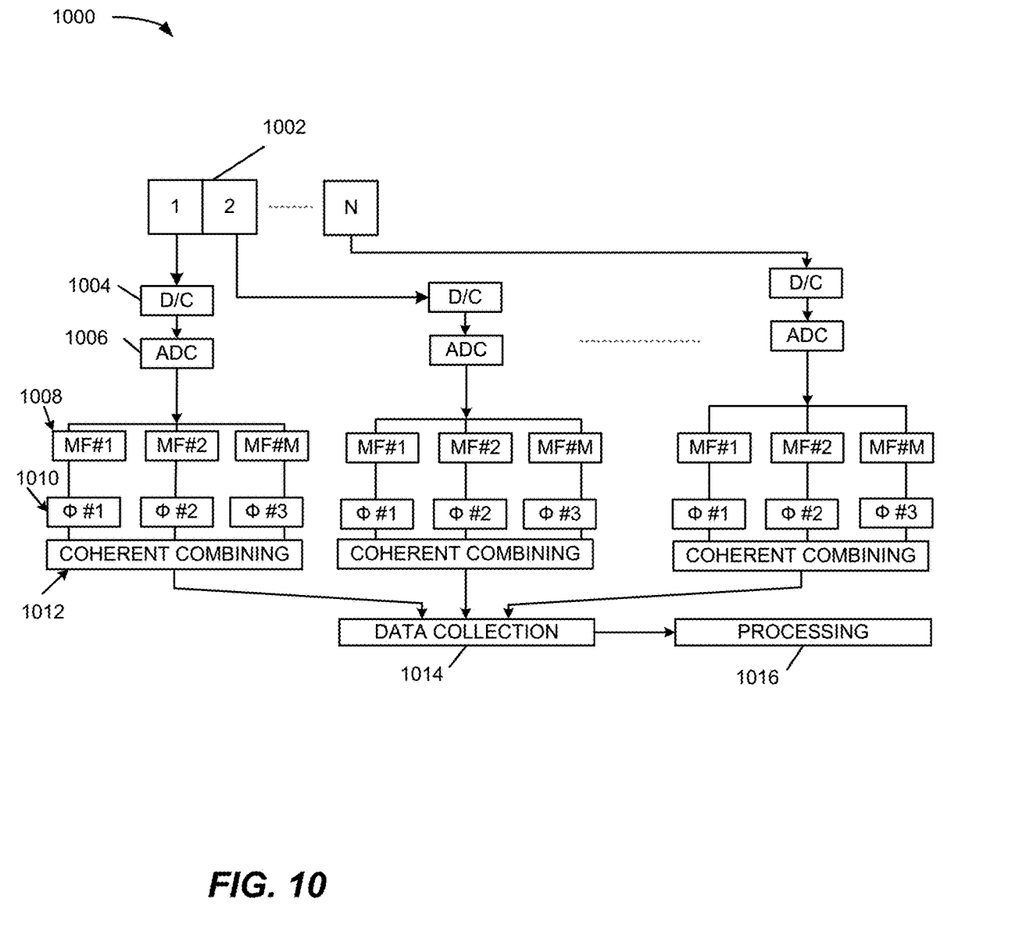
FIG. 10 conceptually illustrates a flow chart of an example MIMO signal process based on a virtual receive array geometry in accordance with various examples of the subject technology.

FIG. 10 conceptually illustrates a flow chart of an example MIMO signal process for beamforming operation using a virtual receive array geometry in accordance with various examples of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

As illustrated, orthogonal Tx waveforms are received by M Matched Filters ("MF") 1008, and then combined at each of the N receivers. The orthogonality of the Tx waveforms means these waveforms do not interfere with each other when they are passed through their respective MF. As used herein, a MF encompasses any signal detection in the presence of a number of orthogonal (or near-orthogonal) and non-orthogonal waveforms. For example, for spectrum spreading waveforms using Pseudo-random Noise ("PN") sequences having good auto-correlation and cross-correlation properties, the matched filtering is to perform code correlation and peak finding processing. For Time-Division Multiple Access ("TDMA") and Frequency-Division Multiple Access ("FDMA") orthogonal waveforms, timing control and channelization filtering are used, respectively.

In some implementations, M orthogonal waveforms can be present at each of the N receive antenna elements 1002. From each receive antenna element 1002 in the physical receive array, all the M orthogonal signals are present and down-converted by frequency conversion modules 1004 (depicted as "D/C") and then sampled by Analog-to-Digital Converters ("ADC") 1006. The obtained digital sample stream is then processed by a MF 1008. In some aspects, the MF 1008 can be a correlator with a local PN code, or a receive filter designed to meet the Nyquist criteria, i.e., inter-symbol interference free with symbol timing. In both cases, decimation is done so that the signals are in symbol level. In some implementations, signal conditioning functionalities may be implicitly contained (not shown). The M orthogonal signals are separated and present to M phase shifters 1010 (depicted as ϕ) for phase alignment, and combined coherently with a coherent combining module 1012. Data is then collected from the outputs from the coherent combining modules 1012 with a data collection module 1014. The resulting signals are then used for application level processing for range, Doppler and imaging, among others, with a processing unit 1016.

Figure 11:
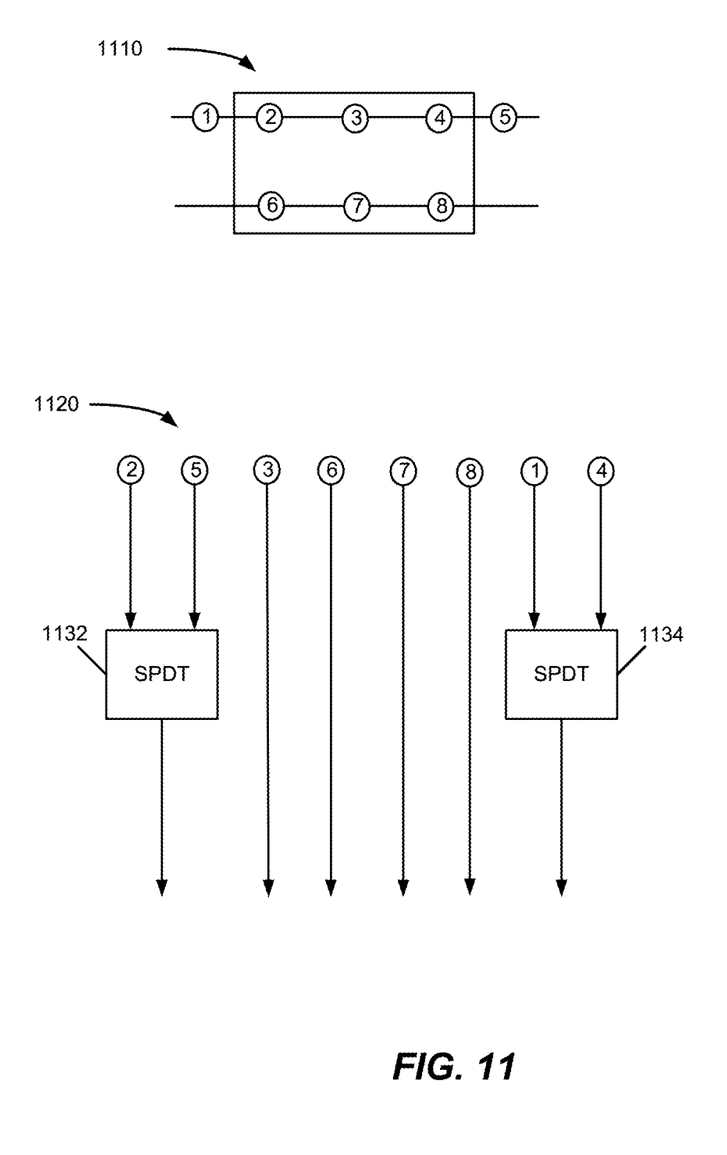
FIG. 11 conceptually illustrates an example of a reconfigurable physical transmit array with a particular MIMO radar configuration in accordance with various examples of the subject technology.

FIG. 11 conceptually illustrates an example of a switch network 1110 for a reconfigurable physical transmit array in accordance with various examples of the subject technology. The reconfigurable physical transmit array may be coupled to multiple Single Pole Double Throw ("SPDT") switches. For example, the reconfigurable physical transmit array may be coupled to two (2) SPDT switches (e.g., 1132 and 1134).

FIG. 11 also depicts a series of input ports 1120 that correspond to the reconfigurable physical transmit array in the switch network 1110, where a subset of the input ports are coupled to the SPDT switches 1132 and 1134. In some implementations, input ports 2 and 5 are coupled to SPDT switch 1232 and input ports 1 and 4 are coupled to SPDT switch 1234. For example, when SPDT switch 1132 takes Input Port 5, and SPDT switch 1134 takes Input Port 4, the SPDT switches 1132 and 1134 cause the reconfigurable physical transmit array to switch to a transmit array with an orientation angle set to +45°. In another example, when SPDT switch 1132 takes Input Port 2, and SPDT switch 1134 takes Input Port 4, the SPDT switches 1132 and 1134 cause the reconfigurable physical transmit array to switch to a transmit array with an orientation angle set to 0°. In still another example, when SPDT switch 1132 takes Input Port 2, and SPDT switch 1134 takes Input Port 1, the SPDT switches 1132 and 1134 cause the reconfigurable physical transmit array to switch to a transmit array with an orientation angle set to −45°.

Figure 12:
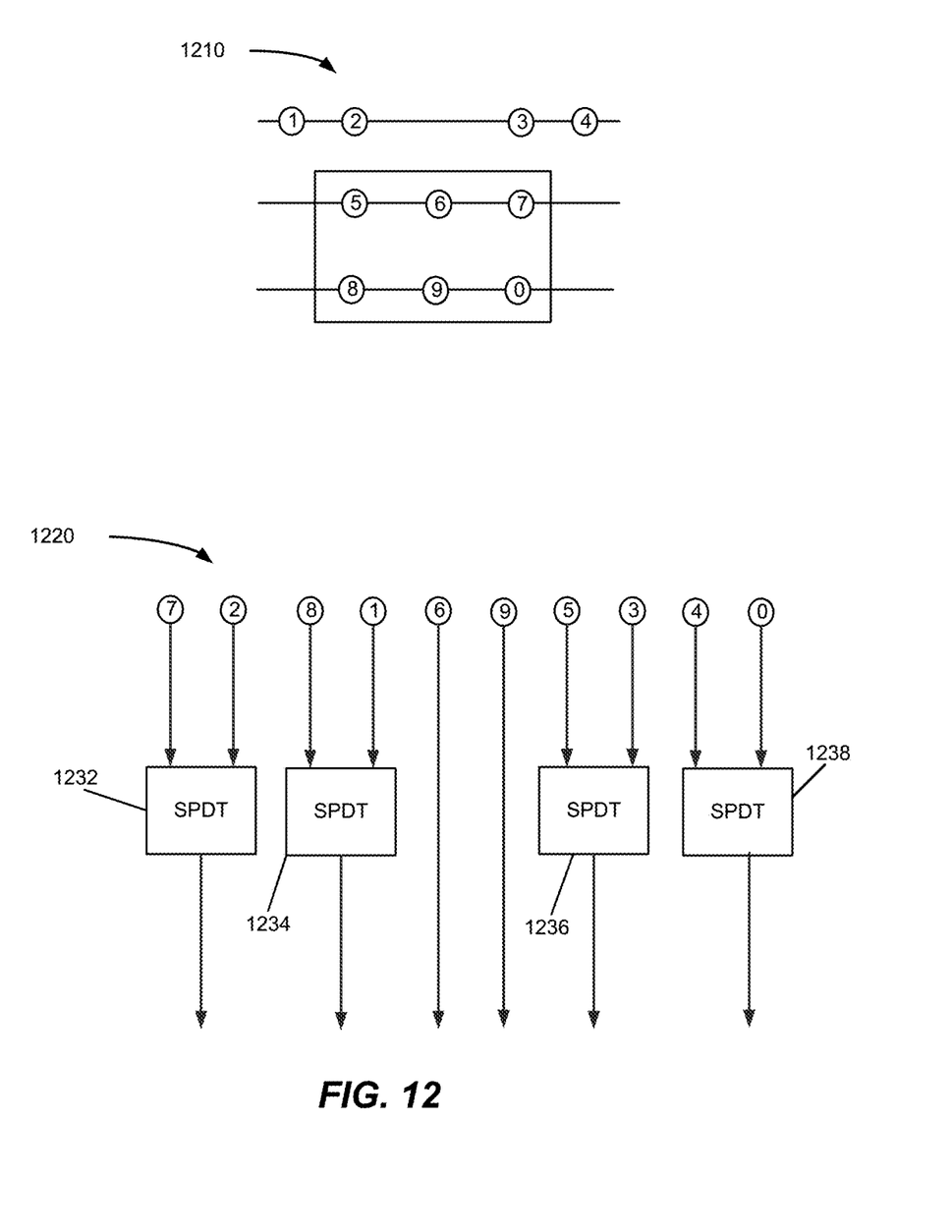
FIG. 12 conceptually illustrates an example of a switch network for a reconfigurable physical receive array in accordance with various examples of the subject technology.

FIG. 12 conceptually illustrates an example of a switch network 1210 for a reconfigurable physical receive array with a particular MIMO radar configuration in accordance with various examples of the subject technology. The reconfigurable physical receive array may be coupled to multiple SPDT switches. For example, the reconfigurable physical receive array may be coupled to four (4) SPDT switches (e.g., 1232, 1234, 1236, 1238).

FIG. 12 also depicts a series of input ports 1220 that correspond to the reconfigurable physical receive array in the switch network 1210, where a subset of the input ports are coupled to the SPDT switches 1232, 1234, 1236, and 1238. In some implementations, input ports 2 and 7 are coupled to the SPDT switch 1232, input ports 1 and 8 are coupled to the SPDT switch 1234, input ports 3 and 5 are coupled to the SPDT switch 1236, and input ports 0 and 4 are coupled to the SPDT switch 1238. For example, when SPDT switch 1232 takes Input Port 2, SPDT switch 1234 takes Input Port 1, SPDT switch 1236 takes Input Port 5, and SPDT 1238 switch takes Input Port 0, the SPDT switches 1232, 1234, 1236 and 1238 cause the reconfigurable physical receive array to switch to a transmit array with an orientation angle set to −45°. In another example, when SPDT switch 1232 takes Input Port 7, SPDT switch 1234 takes Input Port 8, SPDT switch 1236 takes Input Port 5, and SPDT switch 1238 takes Input Port 0, the SPDT switches 1232, 1234, 1236 and 1238 cause the reconfigurable physical receive array to switch to a transmit array with an orientation angle set to 0°. In still another example, when SPDT switch 1232 takes Input Port 7, SPDT switch 1234 takes Input Port 8, SPDT switch 1236 takes Input Port 3, and SPDT switch 1238 takes Input Port 4, the SPDT switches 1232, 1234, 1236 and 1238 cause the reconfigurable physical receive array to switch to a transmit array with an orientation angle set to +45°.

It is appreciated that the previous description of the disclosed examples is provided to enable any person skilled in the art to make or use the present disclosure. Various modifications to these examples can be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying fig-

What is claimed is:

1. A method of processing data for an antenna system, comprising:
synthesizing a virtual receive array representing a plurality of transmit antennas and a plurality of receive antenna elements of the antenna system;
determining a manifold matrix that represents the virtual receive array based on a function of a geometry of the virtual receive array, a carrier frequency, and a direction of arrival of signal data received from the plurality of transmit antennas;
generating a transformation matrix from the virtual receive array and the manifold matrix; and
determining a linear transformation matrix using an optimization criterion that is a function of the virtual receive array and the transformation matrix,
wherein the antenna system is configured to operate in a Multiple-Input Multiple-Output (MIMO) radar system.

2. The method of claim 1, further comprising:
generating a data set representing beam steering properties using the determined linear transformation matrix and the received signal data.

3. The method of claim 1, wherein the virtual receive array is represented as:

$$A = \begin{bmatrix} g_{11}e^{-jw_0\tau_{11}} & \cdots & g_{1N}e^{-jw_0\tau_{1N}} \\ \vdots & \ddots & \vdots \\ g_{M1}e^{-jw_0\tau_{M1}} & \cdots & g_{MN}e^{-jw_0\tau_{MN}} \end{bmatrix}$$

where $g_{ij}$ is channel response between $i^{th}$ transmit antenna to $j^{th}$ receive antenna element, $w_o$ is a center frequency, and $\tau_{ij}$ is time delay between the $i^{th}$ transmit antenna to the $j^{th}$ receive antenna element, for i=1, 2, ..., M and j=1, 2, ..., N.

4. The method of claim 3, wherein the time delay $\tau_{ij}$ is defined as:

$$\tau_{ij} = \frac{1}{c}d_{ij}\sin(\theta_i)$$

where $d_{ij}$ is a distance between the $i^{th}$ transmit antenna to a reference element, $\Theta_i$, which is an incident angle between a direction of an incident signal received at the $i^{th}$ transmit antenna and a normal perpendicular to a plane of the virtual receive array.

5. The method of claim 4, further comprising:
digitally processing the incident signal as a radar return signal.

6. The method of claim 1, further comprising:
applying the linear transformation matrix to a first transmit antenna of the plurality of transmit antennas; and
determining a second transmit antenna positioned at an angle relative to an original position of the first transmit antenna.

7. The method of claim 1, further comprising:
applying the linear transformation matrix to a first receive antenna element of the plurality of receive antenna elements; and
determining a second receive antenna at an angle relative to an original position of the first receive element.

8. A radar system, comprising:
an array of antenna elements comprising a plurality of transmit antenna elements and a plurality of receive antenna elements; and
a digital signal processing unit configured to apply virtual antenna beam steering to the radar system, the virtual antenna beam steering comprising a virtual receive antenna array representing the array of antenna elements and a transformation matrix configured to perform linear transformations on the virtual receive antenna array,
wherein the array of antenna elements comprises a first transmit subarray and a second transmit subarray, the first transmit subarray associated with a first steering angle of the radar system.

9. The radar system of claim 8, wherein the radar system is a Multiple-Input Multiple-Output (MIMO) radar system.

10. The radar system of claim 8, wherein the virtual receive antenna array is represented by a manifold matrix that is a function of a geometry of the array of antenna elements and a carrier frequency.

11. The radar system of claim 8, further comprising:
a MIMO radar configuration configured to apply linear transformation to the plurality of transmit antenna elements to determine a second steering angle for the second transmit subarray.

12. The radar system of claim 11, wherein the plurality of receive antenna elements comprises a first receive subarray and a second receive subarray, and wherein the MIMO radar configuration is further configured to apply linear transformation to the plurality of receive antenna elements to determine a second receive angle for the second receive subarray.

13. The radar system of claim 8, further comprising:
a memory storage device that stores a data set representing beam steering properties for linear transformations in the radar system.

14. A method of operating a beam steering radar, comprising:
determining a manifold matrix from an antenna array of the beam steering radar, the antenna array comprising a plurality of transmit antennas and a plurality of receive antennas;
applying a plurality of steering angle properties to the manifold matrix;
generating a transformation matrix based on the applied steering angle properties to the manifold matrix;
applying a linear transformation to the manifold matrix using the generated transformation matrix; and
producing a data set representing beam steering properties of the beam steering radar based on the applied linear transformation.

15. The method of claim 14, further comprising:
storing the generated data set representing the beam steering properties of the beam steering radar in a memory storage unit coupled to the beam steering radar.

16. The method of claim 14, further comprising:
applying a linear transformation matrix with interpolation to the manifold matrix to generate an oriented virtual subarray.

17. The method of claim 14, wherein the beam steering radar is a Multiple-Input Multiple-Output (MIMO) radar system.

18. The method of claim 14, wherein the manifold matrix represents a virtual receive array based on a function of a carrier frequency and direction of arrival of signals received at least at a portion of the plurality of transmit antennas.

19. A radar system, comprising:
an array of antenna elements comprising a plurality of transmit antenna elements and a plurality of receive antenna elements;
a digital signal processing unit configured to apply virtual antenna beam steering to the radar system, the virtual antenna beam steering comprising a virtual receive antenna array representing the array of antenna elements and a transformation matrix configured to perform linear transformations on the virtual receive antenna array; and
a memory storage device that stores a data set representing beam steering properties for linear transformations in the radar system.

20. The radar system of claim 19, wherein the radar system is a Multiple-Input Multiple-Output (MIMO) radar system.

* * * * *